United States Patent [19]

Netherton

[11] 4,102,324

[45] Jul. 25, 1978

[54] SOLAR HEATING ASSEMBLY

[76] Inventor: Oliver E. Netherton, 119 N. Arcturas Ave., Clearwater, Fla. 33515

[21] Appl. No.: 708,213

[22] Filed: Jul. 23, 1976

[51] Int. Cl.² ............................................... F24J 3/02
[52] U.S. Cl. ..................................... 126/270; 126/271
[58] Field of Search ............... 126/270, 271; 237/1 A; 165/162; 272/56.5 R, 113, 85; D34/5 M, 5 L, 5 K, 5 E, 5 C

[56] References Cited

U.S. PATENT DOCUMENTS

| | | | |
|---|---|---|---|
| 313,757 | 3/1885 | Nelson | D34/5 L X |
| 1,325,596 | 12/1919 | Trosper | 126/271 |
| 3,539,181 | 11/1970 | Larsen | 272/56.5 R |
| 3,850,428 | 11/1974 | Zuber | 272/113 |
| 3,931,806 | 1/1976 | Hayes | 126/271 |
| 3,968,652 | 7/1976 | Chevalier | 126/271 X |
| 3,985,119 | 10/1976 | Oakes, Jr. | 126/271 |
| 4,038,964 | 8/1977 | Drew | 126/271 |

FOREIGN PATENT DOCUMENTS

| | | | |
|---|---|---|---|
| 575,236 | 5/1959 | Canada | 165/162 |
| 18,998 of | 1914 | United Kingdom | 126/271 |

*Primary Examiner*—William F. O'Dea
*Assistant Examiner*—Larry Jones
*Attorney, Agent, or Firm*—Duckworth, Hobby, Allen & Pettis

[57] ABSTRACT

A solar heating assembly including a radiant energy collector having a casing where fluid conduit is mounted therein in substantially suspended fashion relative to the interior space of the casing and angularly oriented, reflective wall surfaces disposed to essentially concentrate the radiant energy on the fluid conduit so as to heat the interior space of the casing and the fluid within the conduit. A brace frame is mounted on the ground or other surface and comprises a plurality of support columns wherein the casing is adjustably mounted adjacent the upper portions of the support columns and brace frame in spaced relation to the ground. A plurality of exercise devices such as children's gym set are mounted in substantially suspended relation wherein the collector assembly of the solar heating assembly is used in combination with the brace frame which is specifically in the form of an exercise device or gym set.

8 Claims, 7 Drawing Figures

SOLAR HEATING ASSEMBLY

BACKGROUND OF THE INVENTION

1. Field of the Invention

This invention relates to a solar heating system including a collector plate primarily designed for heating fluid such as in a water heater or swimming pool, etc. The collector assembly of the system is specifically mounted in combination with a brace frame disposing the collector assembly in spaced relation to the ground or surface on which the assembly is mounted wherein the brace frame also serves as a gym set or support frame for a plurality of exercise devices.

2. Description of the Prior Art

Solar heating systems have long been known as a method of obtaining hot fluid without the use of traditional fuels. The prior art is exemplified by U.S. patents to H. A. Wheeler, U.S. Pat. Nos. 1,753,227, 1,853,480 and 1,971,242. While these patents do not demonstrate all the modern structures of the development of solar heat systems, they are representative of certain basic structures which are commonly in use.

There are recognized certain inherent disadvantages exemplified in the prior art which is available both commercially and in U.S. issued patents. Conventionally solar water heater structures comprise various designed collector assemblies having fluid conduit means directly attached to some type of absorbing collector plate wherein heat is transmitted to the fluid directly through conductance from the plate itself. While the general design and structure of such prior art devices is operable for certain applications, the lack of efficiency is generally questioned.

However, the common inherent problem associated with such prior art devices is the lack of efficiency in operation and performance and therefore the lack of required performance characteristics in maintaining a given amount of fluid at a predetermined temperature. Alternately, efficiency or operating characteristics are unacceptable due to the length of time it takes to heat certain quantities of water and transfer such heated quantities to a storage tank for use at a later time.

Finally, other problems associated with the manufacture, use and sale of such prior art solar water heaters is the storage of the collector assembly itself. Water is generally considered a heavy fluid and the accumulation of significant amounts of water within the collector assembly naturally increases its weight to the point where the collector assembly itself is not adaptable for mounting on roofs or the tops or sides of normal dwelling structures. Along this line such disadvantages further include the general unsightly appearance of such collector assemblies when they are positioned for proper exposure to the sun's radiant energy. Because of the abnormally great weight that accompany operation or use of such collector assemblies frequently special support frames must be utilized to maintain their position of exposure to the sun's radiant energy in a safe manner. Again, this often adds to the unsightliness of the entire display of the collector assembly, therefore, detracting from the desirability of using the entire system.

It is, therefore, readily seen that there is a need in the heating industry for an efficient, durable and low maintenance solar energy heating system capable of being mounted for direct exposure to the sun's radiant energy while at the same time mounting such collector assembly in a manner which will not detract from the aesthetic appearance of the system in its entirety.

SUMMARY OF THE INVENTION

This invention relates to a solar heating assembly of the type primarily designed to heat fluid such as in a domestic water heater, swimming pool or the like. More specifically, the heating system comprises a collector assembly having a casing and preferably an inner wall surface having a predetermined configuration. The inner wall surface is defined by a plurality of panels arranged in angular relation to one another and each including a reflective material surface over at least a major portion of the area thereof. The angular orientation of the panel and the reflective surfaces being a part thereof are direct so as to concentrate the solar radiation on or about the fluid conduit so as to add to the efficiency of rising the temperature within the casing.

Conduit connection means in the form of a plurality of brackets are mounted substantially adjacent a transparent facing of the casing. At least two of the brackets are disposed in engaging, supporting relation to the fluid conduit and disposed to extend inwardly towards the center or interior space of the casing. Accordingly, the fluid conduit connected to the brackets is maintained in essentially suspended relation within the interior space of the casing and in specific spaced apart relation from any of the wall surfaces of the casing.

The solar heating system further comprises a brace means disposed or mounted on a ground or other surface on which the heating assembly is supported. More specifically, the brace means comprises a plurality of support columns disposed in laterally spaced relation to one another and including a platform means connected to the various support columns along the upper vicinity or portion thereof. An important feature of the present invention is the use of the collector assembly of the present invention in combination with a brace frame means which is also specifically structured and configured to serve as an exercise assembly or gym set of the type generally used by youngsters.

More specifically, the brace means of the present invention includes a plurality of exercise devices attached thereto in spaced relation to one another and in generally suspended fashion from an overhanging support strut. This support strut is positioned to at least partially support the various of the plurality of exercise devices in suspended and/or movable connection. The casing of the collector assembly is preferably, adjustably positioned on the upper portion or vicinity of the brace means wherein the weight of the casing is primarily supported by the plurality of support columns defining the brace means.

In the structure and operation of the system itself interconnecting conduit is connected to the casing and more particularly the fluid conduit maintained therein. The opposite end is disposed at the point of delivery or storage means for the heated fluid. Therefore, the interconnecting conduit is disposed in interconnecting, fluid communication between the fluid conduit means within the casing of the collector assembly at the point of delivery or usage of the heated water or fluid. In that the preferred embodiment of the present invention is directed to the collector assembly used in combination with the brace frame means in the form of a gym set or exercise assembly, an important structure of the present invention further comprises at least one of the plurality of support columns having a hollow interior configuration. Accordingly, at least a portion of the length of the interconnecting conduit is disposed on the interior of the support column or columns having a hollow interior configuration. Therefore, a portion of the length of the interconnecting conduit may be connected in direct fluid communication to the fluid means within the casing and extend therefrom through the hollow interior configuration of at least one of the support columns to an underground position of exit or location below the surface on which the base frame is mounted. From this point the interconnecting conduit may run directly to the storage facility in the form of a storage tank, pool or like point of delivery.

Alternately, one form of the embodiment of the present invention comprises a portion of the length of the interior conduit being defined by the hollow configuration of at least one of the support columns itself. In this embodiment fluid flows throughout the interior of the support column rather than a separate conduit structure mounted therein.

In addition, the hollow interior structured conduit may further serve as a casing for conductor line or like facility used to power pump structure thermostat, sensing devices or like control means utilized in the automatic functioning of the solar heating system.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
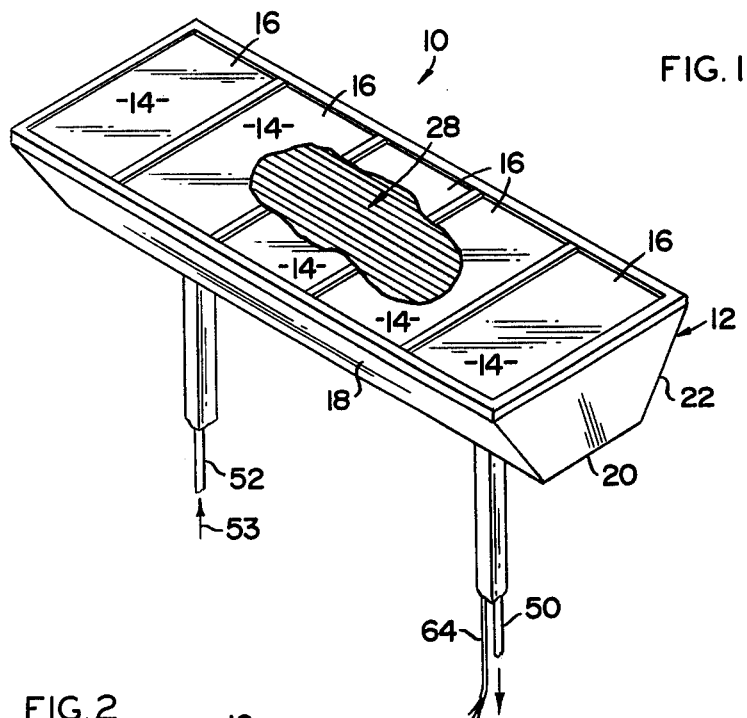
FIG. 1 is an isometric view partially cutaway of one embodiment of the collector assembly of the present invention.
Figure 2:
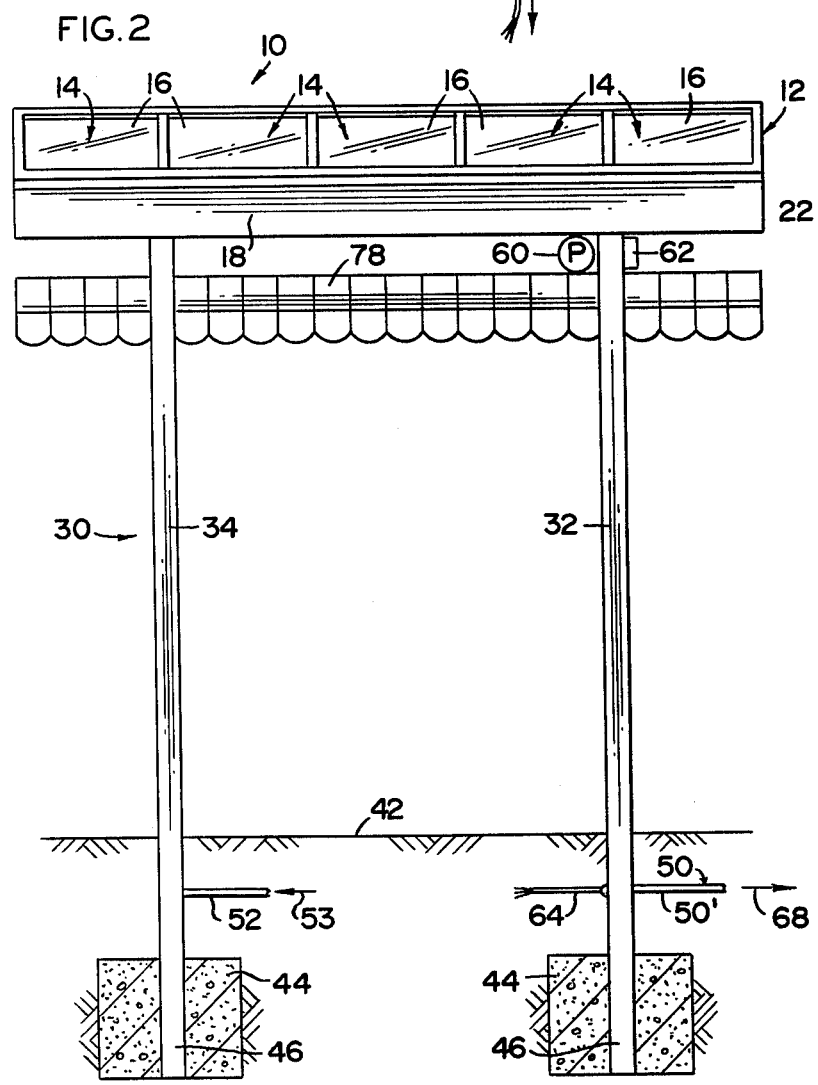
FIG. 2 is a front view of the collector assembly and brace frame on which it is mounted.
Figure 3:
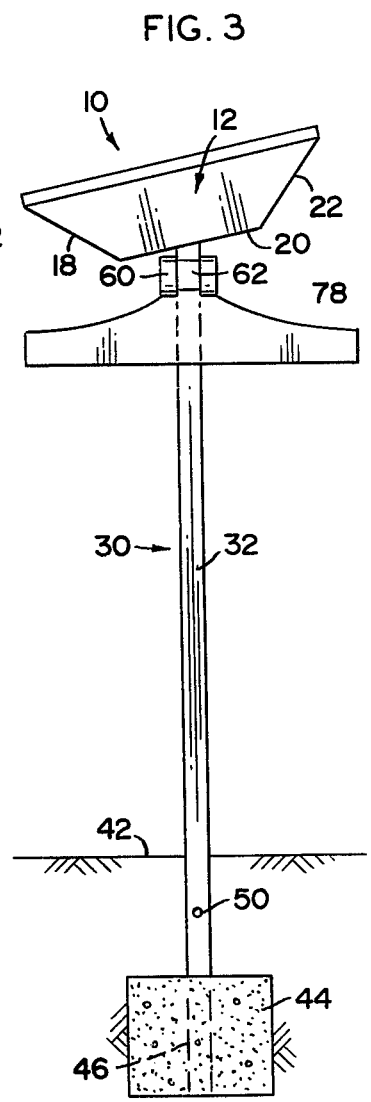
FIG. 3 is a side view of the embodiment of FIG. 2.

As shown in FIGS. 1, 2 and 3, the solar heating system of the present invention generally comprises a collector assembly generally indicated as 10 which includes a casing 12 having a facing portion 14 disposed over the central face or top portion thereof. In one embodiment of the present invention the facing 14 may comprise a plurality of panels 16 which incorporate a transparent material such as glass or the like. The structure and configuration of the casing 12 is such that it is defined by a plurality of panels 18, 20 and 22 having a substantially longitudinal orientation relative to the longitudinal axis of the casing. Each of these panels are angularly oriented to one another and each comprise a surface portion 24 having a reflective material such as aluminum or metallic foil thereon. The angular orientation of the plurality of panels is such as to substantially concentrate the sun's radiation onto fluid conduit means 28 mounted within the casing 12 and generally defining a single continuous path of fluid flow along the length of the adjacently positioned fluid conduit means 28.

Figure 5:
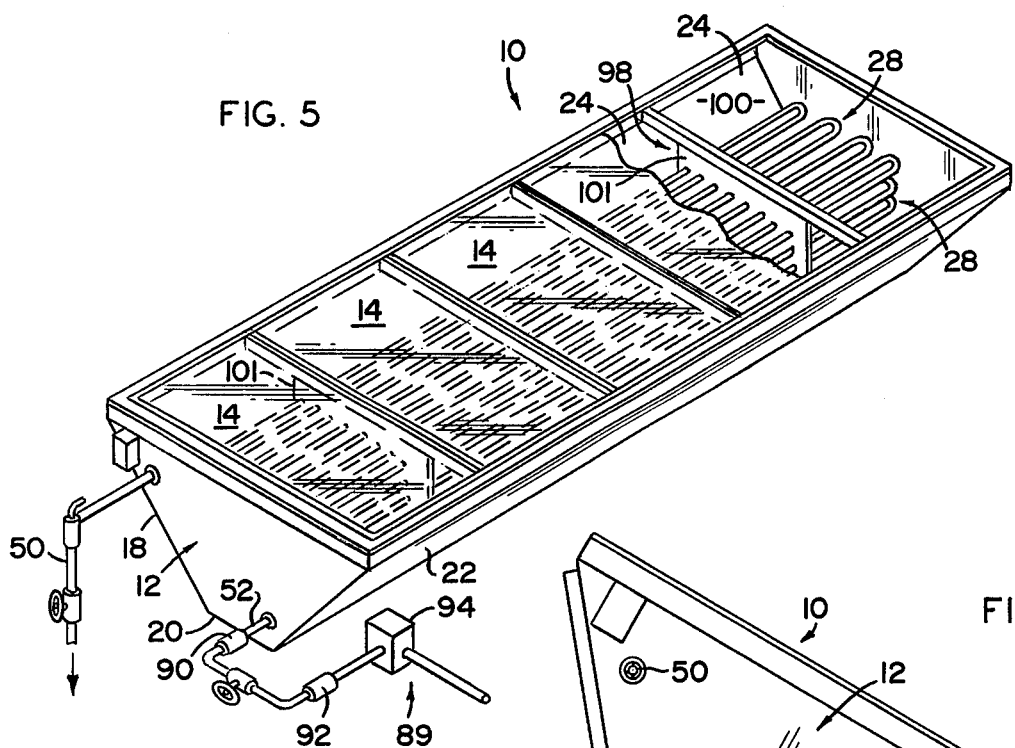
FIG. 5 is an isometric view of one embodiment of the collector assembly of the present invention.
Figure 6:
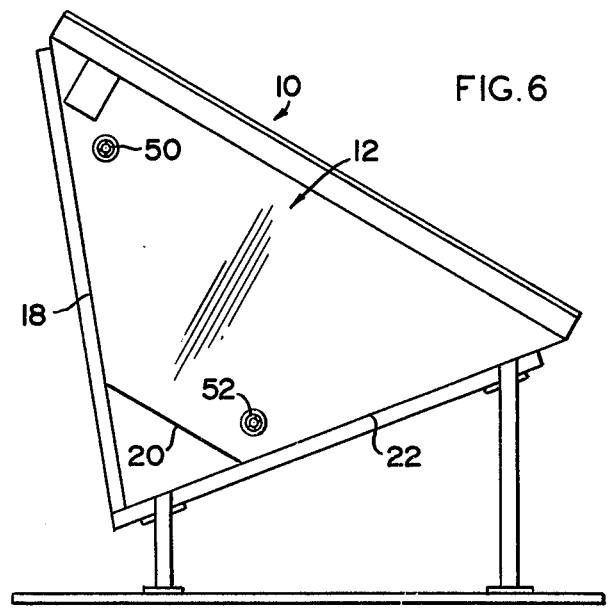
FIG. 6 is an end view of the embodiment of FIG. 5.
Figure 7:
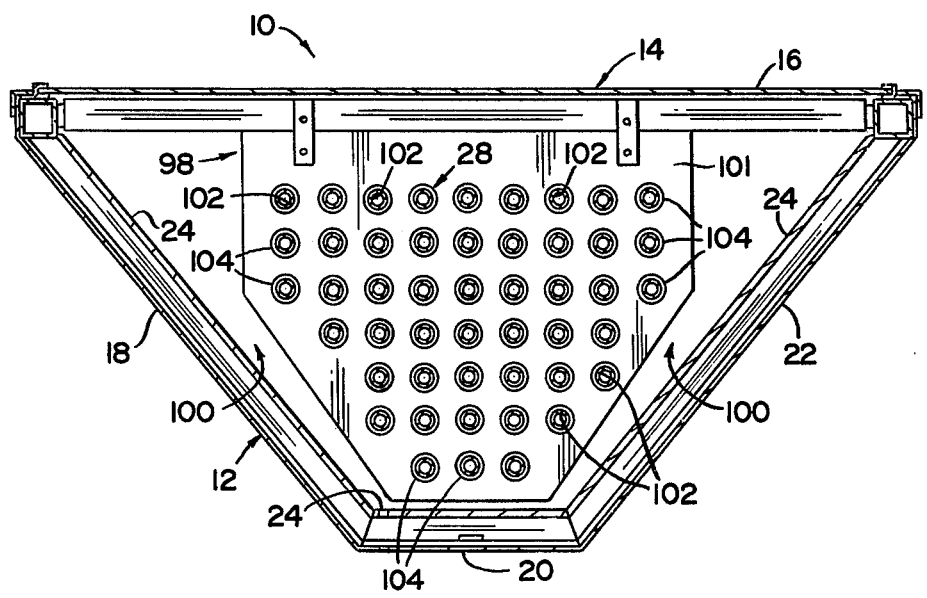
FIG. 7 is a sectional view showing the interior of the casing and details of the baffle means for holding the conduits within the casing interior.

As set forth above, the conduit means 28 are mounted on the interior of the casing 12 in substantially suspended fashion relative to the interior space defined by the plurality of panels 18, 20 and 22 and the facing 14. This suspended mounting is accomplished through the use of conduit connecting means comprising a plurality of bracket means disposed in spaced relation to one another. As best shown in FIG. 5 and 7, each of the bracket means generally indicated as 98 are mounted substantially adjacent to the facing 14 and disposed and configured to extend inwardly toward the interior space 100 of the casing. Each of the bracket means 98 are defined by a baffle type structure 101 wherein a plurality of apertures 102 are formed in the bracket itself. These apertures 102 are specifically configured to substantially surround the individual fluid conduit means 28. However, there is no metal to metal contact between the fluid conduit means 28 and the bracket means 101 themselves in that an insulation ring 104 is mounted in the apertures 102 and disposed in surrounding relation to the fluid conduit means 28 between the outer surface of the fluid conduit means 28 and the inner wall of the apertures 102 itself. Therefore, the fluid conduit means 28 is disposed on the interior space 100 of the casing in suspended fashion and in substantially spaced relation from any of the wall panels or inner wall surfaces 22 of the casing 10 itself. Accordingly, heat is transferred to the fluid within the fluid conduit means 28 by convection in that the atmosphere maintained within the casing serves as a heated plenum. Heat is passed to the fluid in the fluid conduit means 28 from the heated atmosphere within the casing (plenum) and eventually transferred to the storage facility or point of delivery of the heated fluid.

Figure 4:
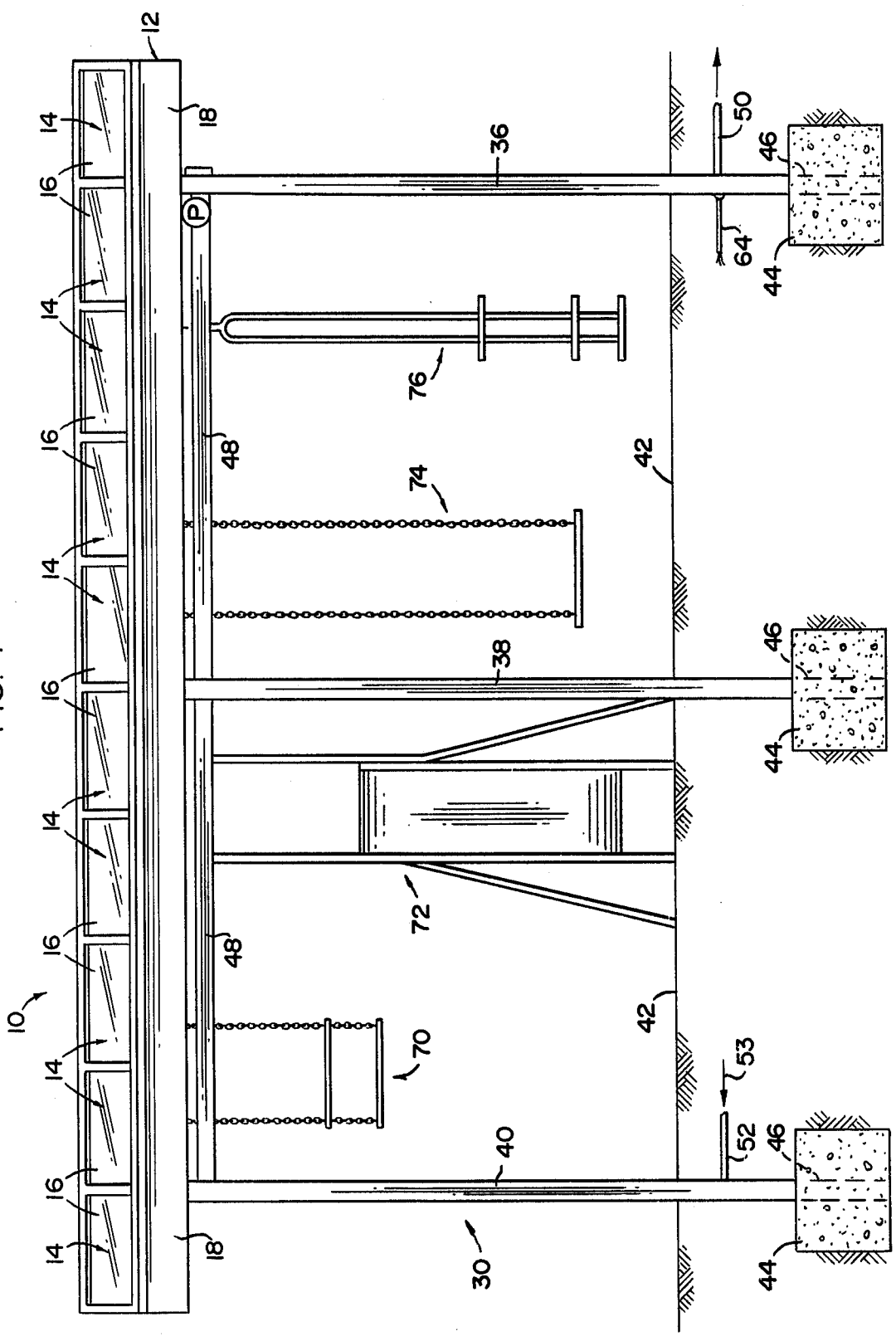
FIG. 4 is a front view of the collector assembly on another embodiment of the brace means particularly adapted to serve as a gym set or exercise assembly.

The solar heating system of the present invention further comprises a brace means in the form of a brace frame generally indicated as 30 in FIGS. 2 and 4. The brace frame means comprises a plurality of support columns 32 and 34 (FIG. 2). In the embodiment of FIG. 4 the brace means 30 comprises a plurality of support columns 36, 38 and 40. Each of the support columns may be mounted on a surface 42 which may represent the ground and anchored in that surface or ground by anchoring means 44. Similarly, the embodiments of FIGS. 2 and 3 may also be mounted on a ground type surface 42 and anchored therein by anchor means 44 attached to the lower extremity 46 of the individual support columns. Referring to the embodiment of FIG. 4 the brace means may further comprise a cross strut 48 extending between the various support columns and generally disposed along the upper portion thereof as indicated.

In either of the embodiments of FIGS. 2, 3 and 4 at least one and preferably a plurality of the support columns are defined by a hollow configuration along at least a portion of their length. The specific structural preference for such a hollow configuration will become more evident as more fully described hereinafter.

In operation fluid is heated in the collector assembly by passing through the fluid conduit means 28. The heated fluid is then transferred from the fluid conduit means through conduit interconnecting means 50 to a point of storage or delivery of the heated fluid (not shown). Similarly, the conduit interconnecting means includes an inlet conduit 52 (FIGS. 1 and 2) wherein water is delivered from a conventional source, as indicated by directional arrow 53, through the conduit interconnecting means 52 and into the fluid conduit means 28 mounted in suspended relation on the interior space of the casing 12.

With specific reference to FIGS. 1, 2, 3 and 4 an important structural feature of the present invention comprises the conduit interconnecting means 50 and 52 mounted on the interior of the hollow configuration of the various support columns 32–40. With reference to FIGS. 2, 3 and 4 the outlet of the fluid conduit interconnecting means can be located below the surface 42 and be buried so as to enhance the aesthetic appearance of the entire system generally.

It is obvious that for the automatic operation and performance of such a solar heating system control means such as pumps generally indicated as 60 and aquastats 62 are needed to regulate the flow of fluid throughout the entire system. The control means and the specific structures including the pumps, thermostats, etc., are normally powered by a conventional electric source. Accordingly, power lines or electrical conductors 64 may further be disposed on the interior of the hollow configuration of any one of the various support columns 32–40.

In yet another embodiment of the present invention the conduit interconnecting means 50 may include the interior configuration of one or more support columns itself rather than having separate conduit means mounted therein. In this embodiment (FIG. 2) the conduit portion indicated as 50' may merely be the outlet for the fluid running through the interior configuration of the support column 32 wherein directional arrow 68 indicates fluid flow to the point of delivery or storage means for the heated fluid.

With regard to the embodiments of FIGS. 2, 3 and 4 an important feature of the present invention comprises the structure of the base means 30 to be specifically adapted to have mounted thereon a plurality of exercise devices 70, 72, 74 and 76. These individual exercise devices are mounted in suspended relation about the brace means in general and the cross strut 48 in particular. One or more of the exercise devices 70, 74 and 76 may be movably mounted in suspended fashion so as to allow proper operation of the various devices relative to one another. As clearly shown the devices are disposed in laterally spaced relation to one another.

Alternately and/or designed for use concurrently, is the embodiment of FIGS. 2 and 3. In this embodiment a shelter means 78 is mounted on the brace means and more particularly is supported in above spaced relation from the surface 42 by the various support columns 32 and 34. This shelter means may take the form of a canopy as shown and may be disposed on the support columns 32 and 34 in substantially overhanging relation to the area or space beneath the canopy or shelter means so as to render shade to this area for use during leisure time or uses other than that associated with the automatic operation of the solar heating system.

Irrespective of the specific auxiliary utilization of the brace means 30, in each of the embodiments shown in FIGS. 2, 3 and 4 the collector assembly 10 is mounted in the upper regions of the brace means 30 and is disposed in substantially overhanging relation to the various support columns 32–40 and disposed in supported relation to these columns. Therefore, it can readily be seen that the aesthetic appearance of the entire system can be greatly enhanced and even made to be an auxiliary utilitarian function by structuring the brace means to be a gym set or exercise assembly having proper sheltering means in the form of a canopy or the like.

With reference to FIG. 5, it should be obvious that the collector assembly itself generally indicated as 10 can be utilized other than with the brace means as shown in the embodiments of FIGS. 2-4. For the proper operation and automatic delivery and return of heated fluid, proper control means generally indicated as 89 in the form of electric control disconnect 90, solenoid 92 and an aquastat structure 94 may be provided in the control means to regulate proper fluid flow and control the temperature thereof. The aquastat means 94 may be of the type commercially available and generally incorporates a thermostat used in combination with a pump structure to circulate water through the fluid conduit means serving as heat exchange coils.

It will thus be seen that the objects made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described,

What is claimed is:

1. A solar heating assembly of the type primarily used to heat fluid from solar radiant energy and utilized in combination with brace means of the type adapted for attachment to a predetermined surface, said combination comprising: a collector assembly including a casing and a fluid conduit means disposed within said casing, said casing including an inner wall surface defined by a plurality of panel members disposed in substantially angular orientation relative to one another, said casing further comprising a facing portion disposed to define a substantially enclosed interior of the casing relative to the plurality of panel members; conduit connection means connected substantially adjacent said facing portion and disposed to extend into the interior space of said casing, said fluid conduit means connected to said conduit connection means and disposed in substantially suspended relation therefrom into the interior space of said casing and in spaced apart relation from each of said plurality of panel members; said brace means comprising a plurality of support columns disposed in laterally spaced relation from one another, said brace means connected in supporting relation to said casing and said support columns disposed at least in part between said casing and the predetermined surface on which said brace means are mounted; and an interconnecting conduit disposed in interconnecting fluid communicating relation between said fluid conduit means within said casing at a point of delivery of the heated fluid, at least one of said support columns having a substantially hollow interior configuration extended along at least a portion of its length, said interconnecting conduit disposed on the interior of said one support column for at least a portion of its length, whereby the rise in temperature within said casing is caused by exposure of said fluid conduit means to solar radiant energy causing the heating of fluid within said fluid conduit means mounted within said casing and disposed in predetermined relation to a supporting surface by said support columns.

2. A solar heating assembly as in claim 1 wherein exposed surfaces of each of said plurality of panel members comprise a substantially reflective material over at least a major portion of the surface thereof, said plurality of panels oriented to reflect direct radiant energy directly onto said fluid conduit means.

3. A solar heating assembly as in claim 1 wherein said conduit connecting means comprises a plurality of brackets, at least two of said brackets being disposed in spaced apart relation to one another in supporting engagement with said fluid conduit means.

4. A solar heating assembly as in claim 1 wherein said interconnecting conduit is defined at least in part by said hollow interior configuration of said one support column, said hollow interior configuration interconnected in fluid communication with said conduit means disposed within said casing.

5. A solar heating assembly as in claim 1 further comprising a plurality of exercise devices disposed in suspended relation from said brace means and disposed in substantially laterally spaced relation to one another.

6. A solar heating assembly as in claim 5 wherein at least some of said plurality of exercise devices are movably suspended from said brace means; said brace means and said plurality of exercise devices defining in combination an exercise assembly.

7. A solar heating assembly as in claim 6 wherein said collector assembly is movably mounted on the upper vicinity of said brace means and in substantially overhanging relation to said plurality of exercise devices.

8. A solar heating assembly as in claim 7 further comprising shelter means connected to said brace means and disposed between said casing and said plurality of exercise devices in overhanging relation to said plurality of exercise devices.

* * * * *